United States Patent [19]

Nilz et al.

[11] Patent Number: 5,630,907
[45] Date of Patent: May 20, 1997

[54] USE OF HYDROLYZED COPOLYMERS OF N-VINYLCARBOXAMIDES AND MONOETHYLENICALLY UNSATURATED CARBOXYLIC ACIDS IN PAPERMAKING

[75] Inventors: Claudia Nilz, Roedersheim-Gronau; Walter Denzinger, Speyer; Heinrich Hartmann, Limburgerhof; Michael Kroener, Mannheim; Friedrich Linhart, Heidelberg; Rudolf Schuhmacher, Boehl-Iggelheim; Dietmar Moench, Weinheim; Andreas Stange, Mannheim, all of Germany

[73] Assignee: BASF Aktiengesellschaft, Ludwigshafen, Germany

[21] Appl. No.: 651,655

[22] Filed: May 21, 1996

Related U.S. Application Data

[63] Continuation of Ser. No. 411,699, filed as PCT/EP93/03305 Nov. 25, 1993, abandoned.

[30] Foreign Application Priority Data

Dec. 7, 1992 [DE] Germany .................... 42 41 117.3

[51] Int. Cl.$^6$ .................................................. D21H 21/10
[52] U.S. Cl. ......................... 162/168.2; 162/168.1
[58] Field of Search ........................... 162/168.2, 168.6, 162/166, 164.6

[56] References Cited

U.S. PATENT DOCUMENTS

| | | | |
|---|---|---|---|
| 2,721,140 | 10/1955 | Weisgerber et al. | 162/158 |
| 3,597,314 | 8/1971 | Laube et al. | 162/168.2 |
| 4,421,602 | 12/1983 | Brunnmueller et al. | 162/158 |
| 4,880,497 | 11/1989 | Pfohl et al. | 162/168.2 |
| 5,232,553 | 8/1993 | Smigo et al. | 162/168.2 |

FOREIGN PATENT DOCUMENTS

| | | |
|---|---|---|
| 0216387 | 4/1987 | European Pat. Off. . |
| 0251182 | 1/1988 | European Pat. Off. . |
| 0438744 | 7/1991 | European Pat. Off. . |
| 0453991 | 10/1991 | European Pat. Off. . |

*Primary Examiner*—Peter Chin
*Attorney, Agent, or Firm*—Oblon, Spivak, McClelland, Maier & Neustadt, P.C.

[57] ABSTRACT

Copolymers which are obtained by copolymerization of a) from 5 to 99 mol % of N-vinylcarboxamides, b) from 95 to 1 mol % of monoethylenically unsaturated carboxylic acids and/or the alkali metal, alkaline earth metal, ammonium or amine salts thereof, and if required, c) up to 30 mol % of other monoethylenically unsaturated compounds, and if required, d) up to 2 mol % of crosslinking agents, and subsequent partial or complete elimination of the acyl groups from the N-vinylcarboxamides polymerized in the copolymer, with formation of amino or ammonium groups, are used as additives to paper stock for increasing the drainage rate and the retention in papermaking, and the dry and wet strength of the paper.

8 Claims, No Drawings

USE OF HYDROLYZED COPOLYMERS OF N-VINYLCARBOXAMIDES AND MONOETHYLENICALLY UNSATURATED CARBOXYLIC ACIDS IN PAPERMAKING

This application is a continuation of application Ser. No. 08/411,699, filed on Apr. 7, 1995, now abandoned, which was filed as Internal Application No. PCT/EP 93/03305 filed on Nov. 25, 1993.

BACKGROUND OF THE INVENTION

1. Field of the Invention

The present invention relates to the use of copolymers which are obtainable by copolymerization of N-vinylcarboxamides with other monoethylenically unsaturated compounds and partial or complete elimination of formyl groups from the N-vinylcarboxamides polymerized in the copolymer, with formation of amino or ammonium groups, as additives to paper stock for increasing the drainage rate and retention in papermaking and the dry and wet strength of the paper.

2. Description of the Background

U.S. Pat. No. 2,721,140 discloses the use of polyvinylamine hydrochloride as an assistant in papermaking, in particular papers having high wet strength being obtained. However, the paper treated in this manner has a relatively high tendency to yellow.

U.S. Pat. No. 4,421,602 discloses partially hydrolyzed, water-soluble homopolymers of N-vinylformamide which contain N-vinylformamide units and vinylamine units. These polymers are used as agents for increasing the flocculation, retention and drainage rate in papermaking.

EP-A-0 438 744 discloses copolymers which contain, as polymerized units, from 99 to 50% by weight of at least one monoethylenically unsaturated carboxylic acid of 3 to 8 carbon atoms or salts thereof and from 1 to 50% by weight of N-vinylcarboxamides, preferably N-vinylformamide, and which have been subjected to hydrolysis in which the formyl groups of the N-vinylcarboxamides are eliminated with formation of amino or ammonium groups. These copolymers are used as water treatment agents for reducing limescale and water hardness deposits in water-conveying systems and in the concentration of sugar juice.

EP-A-0 216 387 discloses water-soluble copolymers which contain vinylamine units and are obtainable by copolymerization of N-vinylformamide with monoethylenically unsaturated monomers selected from the group consisting of vinyl acetate, vinyl propionate, $C_1$- to $C_4$-alkyl vinyl ethers, the esters, nitriles and amides of acrylic acid and methacrylic acid and N-vinylpyrrolidone and elimination of the formyl groups from the copolymers. These copolymers and, preferably, copolymers of N-vinylformamide and vinyl acetate, from 30 to 100 mol % of whose monomer units are hydrolyzed in each case, are used as agents for increasing the dry and wet strength of paper.

EP-B-0 251 182 discloses copolymers which contain vinylamine groups in salt form, vinylformamide groups and acrylonitrile groups and, if required, acrylamide and acrylic acid groups. The amount of polymerized acrylic acid or methacrylic acid is not more than 6.4 mol %. These copolymers are used in papermaking and act as drainage and retention agents and as agents for increasing the dry strength of paper.

It is an object of the present invention to provide a further paper aid which, when added to the paper stock, leads to an increase in the mechanical strengths of the papers thus produced and at the same time increases the drainage rate and retention.

SUMMARY OF THE INVENTION

We have found that this object is achieved, according to the invention, by the use of copolymers which are obtainable by copolymerization of a) from 5 to 99 mol % of N-vinylcarboxamides of the formula

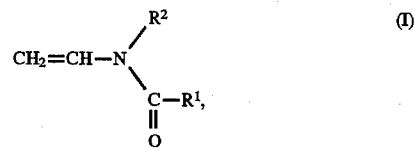

where $R^1$ and $R^2$ are each H or $C_1$–$C_6$-alkyl, b) from 95 to 1 mol % of monoethylenically unsaturated carboxylic acids of 3 to 8 carbon atoms and/or the alkali metal and ammonium salts thereof and, if required, c) up to 30 mol % of vinyl acetate, N-vinylpyrrolidone or N-vinylimidazole and, if required, d) up to 2 mol % of compounds which have at least two ethylenically unsaturated nonconjugated double bonds in the molecule, and subsequent partial or complete elimination of

from the monomers I polymerized in the copolymer, with formation of amino or ammonium groups, as additives to paper stock for increasing the drainage rate and the retention in papermaking and the dry and wet strength of the paper.

DETAILED DESCRIPTION OF THE INVENTION

The copolymers to be used according to the invention are prepared by free radical copolymerization of N-vinylcarboxamides and monoethylenically unsaturated carboxylic acids, preferably acrylic acid and/or methacrylic acid, and salts thereof and, if required, other monoethylenically unsaturated monomers. The copolymerization may be carried out, if required, additionally in the presence of crosslinking agents.

Suitable monomers of group a) are N-vinylcarboxamides of the formula

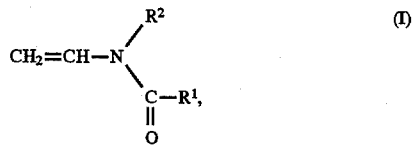

where $R^1$ and $R^2$ are each H or $C_1$–$C_6$-alkyl. Examples of suitable monomers are N-vinylformamide, N-vinyl-N-methylformamide, N-vinylacetamide, N-vinyl-N-methylacetamide, N-vinyl-N-ethylacetamide, N-vinyl-N-methylpropionamide and N-vinylpropionamide, For the preparation of the copolymers, the stated monomers may be used either alone or as a mixture with one another. From this group of monomers, N-vinylformamide is preferably used. The copolymers contain the monomers of group a) in amounts of from 5 to 99, preferably from 30 to 95, mol % in polymerized form.

Suitable monomers of group b) are monoethylenically unsaturated carboxylic acids of 3 to 8 carbon atoms and the water-soluble salts of these monomers. This group of monomers includes, for example, acrylic acid, methacrylic acid, dimethylacrylic acid, ethacrylic acid, maleic acid, citraconic acid, methylenemalonic acid, allylacetic acid, vinylacetic acid, crotonic acid, fumaric acid, mesaconic acid and itaconic acid. From this group of monomers, acrylic acid, methacrylic acid, maleic acid or mixtures of the stated carboxylic acids, in particular mixtures of acrylic acid and maleic acid or mixtures of acrylic acid and methacrylic acid, are preferably used. The monomers of group b) may be used either in the form of the free carboxylic acids or in partially or completely neutralized form in the copolymerization. The monoethylenically unsaturated carboxylic acids are neutralized using, for example, alkali metal or alkaline earth metal bases, ammonia or amines, for example sodium hydroxide solution, potassium hydroxide solution, sodium carbonate, potassium carbonate, sodium bicarbonate, magnesium oxide, calcium hydroxide, calcium oxide, ammonium, triethylamine, ethanolamine, diethanolamine, triethanolamine, morpholine, diethylenetriamine or tetraethylenepentamine. The copolymers contain the monomers of group b) in an amount of from 95 to 1, preferably from 70 to 5, mol % in polymerized form.

The copolymers of the monomers a) and b) can, if required, be modified by using in the copolymerization other monoethylenically unsaturated compounds which are copolymerizable with the monomers a) and b). Examples of suitable monomers of group c) are the esters, amides and nitriles of the carboxylic acids stated under a), for example methyl acrylate, ethyl acrylate, methyl methacrylate, ethyl methacrylate, hydroxyethyl acrylate, hydroxypropyl acrylate, hydroxybutyl acrylate, hydroxyethyl methacrylate, hydroxypropyl methacrylate, hydroxyisobutyl acrylate, hydroxyisobutyl methacrylate, monomethyl maleate, dimethyl maleate, monoethyl maleate, diethyl maleate, 2-ethylhexyl acrylate, 2-ethylhexyl methacrylate, acrylamide, methacrylamide, N-dimethylacrylamide, N-tert-butylacrylamide, acrylonitrile, methacrylonitrile, dimethylaminoethyl acrylate, dimethylaminoethyl methacrylate, diethylaminoethyl acrylate or diethylaminoethyl methacrylate, and the salts of the last-mentioned monomers with carboxylic acids or mineral acids and the quaternized products. Other suitable monomers of group c) are acrylamidoglycolic acid, vinylsulfonic acid, allylsulfonic acid, methallylsulfonic acid, styrenesulfonic acid, 3-sulfopropyl acrylate, 3-sulfopropyl methacrylate and acrylamidomethylpropanesulfonic acid and monomers containing phosphonic acid groups, such as vinyl phosphate, allyl phosphate and acrylamidomethylpropanephosphonic acid. Further suitable compounds of this group are N-vinylpyrrolidone, N-vinylcaprolactam, N-vinyl-2-methylimidazoline, diallylammonium chloride, vinyl acetate and vinyl propionate. It is of course also possible to use mixtures of the stated monomers of group c), for example mixtures of acrylates and vinyl acetate, mixtures of different acrylates, mixtures of acrylates and acrylamides or mixtures of acrylamide and hydroxyethyl acrylate. Among the monomers of group c), acrylamide, acrylonitrile, vinyl acetate, N-vinylpyrrolidone, N-vinylimidazole or mixtures of these monomers, for example mixtures of acrylamide and vinyl acetate or mixtures of acrylamide and acrylonitrile, are preferably used. If the monomers of group c) are used for modifying the copolymers, they are present in the copolymers in polymerized form in amounts of up to 30, preferably from 1 to 20, mol %.

The copolymers of the monomers a) and b) and, if required, c) may furthermore be modified by carrying out the copolymerization in the presence of monomers of group d), which are compounds which have at least two ethylenically unsaturated nonconjugated double bonds in the molecule. The presence of the monomers of group d) in the copolymerization results in an increase in the K values of the copolymers. Examples of suitable compounds of group d) are methylenebisacrylamide, esters of acrylic acid and methacrylic acid with polyhydric alcohols, such as glycol diacrylate, glyceryl triacrylate, glycol dimethacrylate or glyceryl trimethacrylate, and polyethylene glycols or polyols, such as pentaerythritol and glucose, which are at least diesterified with acrylic acid or methacrylic acid. Other suitable crosslinking agents are divinylbenzene, divinyldioxane, pentaerythrityl triallyl ether and pentaallylsucrose. Water-soluble monomers, such as glycol diacrylate or glycol diacrylates of polyethylene glycols having a molecular weight of up to 3000, are preferably used from this group. If the monomers of group d) are used for modifying the copolymers, the amounts employed are up to 2 mol %. Where they are used, they are preferably present in the copolymers in polymerized form in an amount of from 0.01 to 1 mol %.

It is preferable to use the compounds which are obtainable by copolymerization of a) from 30 to 95 mol % of N-vinylformamide, b) from 70 to 5 mol % of acrylic acid, methacrylic acid and/or the alkali metal, alkaline earth metal, ammonium or amine salts thereof and c) from 0 to 30 mol % of acrylamide, acrylonitrile, vinyl acetate, N-vinylpyrrolidone, N-vinylimidazole or mixtures thereof, and subsequent partial or complete hydrolysis of the polymerized N-vinylformamide units, for example copolymers of N-vinylformamide, acrylic acid and acrylamide, copolymers of N-vinylformamide, acrylic acid and acrylonitrile, copolymers of N-vinylformamide, acrylic acid and vinylacetate, copolymers of N-vinylformamide, acrylic acid and N-vinylpyrrolidone, copolymers of N-vinylformamide, acrylic acid, acrylonitrile and vinyl acetate, and copolymers of N-vinylformamide, acrylic acid, acrylamide and acrylonitrile. In the copolymers last described, some or all of the acrylic acid may be replaced by methacrylic acid. Acrylic acid or methacrylic acid may be partially or completely neutralized with sodium hydroxide solution, potassium hydroxide solution, calcium hydroxide or ammonia.

The copolymers are prepared by known processes, for example solution, precipitation, suspension or emulsion polymerization, using compounds which form free radicals under the polymerization conditions. The polymerization temperatures are usually from 30° to 200° C., preferably from 40° to 110° C. Examples of suitable initiators are azo and peroxy compounds and the conventional redox initiator systems, such as combinations of hydrogen peroxide and reducing compounds, eg. sodium sulfite, sodium bisulfite, sodium formaldehyde sulfoxylate and hydrazine. These systems can, if required, additionally contain small amounts of a heavy metal salt.

The copolymers are preferably prepared by solution polymerization in water, the monomers of group b) preferably being used in salt form and the pH being kept at from 6 to 8 during the polymerization. In order to keep the pH constant during the copolymerization, it is advantageous to add small amounts, for example from 0.5 to 2% by weight, of a buffer, for example disodium hydrogen phosphate.

Preferably used polymerization initiators are water-soluble azo compounds, such as 2,2'-azobis(2-methylpropionamidine) dihydrochloride, 2,2'-azobis(4-methoxy-2,4-dimethylvaleronitrile) and 2,2'-azobis(2-methyl-N-phenylpropionamidine) dihydrochloride.

In order to prepare low molecular weight copolymers, the copolymerization is carried out in the presence of a regulator. Examples of suitable regulators are secondary alcohols, such as isopropanol and sec-butanol, hydroxylamine, formic acid and mercapto compounds, such as mercaptoethanol, mercaptopropanol, mercaptobutanol, thioglycolic acid, thiolactic acid, tert-butyl mercaptan, octyl mercaptan and dodecyl mercaptan. The regulators are usually used in amounts of from 0.01 to 5% by weight, based on the monomers used. If secondary alcohols are used as regulators, the polymerization may also be carried out in the presence of substantially larger amounts, for example up to 80% by weight, based on the monomers. In these cases, the secondary alcohols are simultaneously solvents for the monomers.

The copolymers thus obtainable have K values of from 30 to 300, preferably from 50 to 250. The K values are determined according to H. Fikentscher, in 5% strength aqueous sodium chloride solution at pH 7, 25° C. and a polymer concentration of 0.1% by weight.

The hydrolyzed copolymers to be used according to the invention are obtained, with formation of amino or ammonium groups, from the copolymers described above, by partial or complete elimination of the formyl groups from the monomers I polymerized in the copolymer:

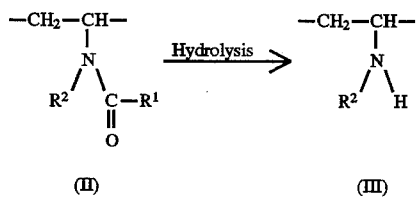

(II)          (III)

In the formulae (II) and (III), $R^1$ and $R^2$ each have the meanings stated in formula (I). Depending on the reaction conditions chosen in the hydrolysis, either partial or complete hydrolysis of the units II is obtained. The hydrolysis is continued so that from 30 to 100, preferably from 60 to 95, % of the monomers a) polymerized in the copolymer are hydrolyzed. In the case of the hydrolysis of copolymers containing vinylformamide units, the degree of hydrolysis can be determined, for example, by polyelectrolyte titration or by enzymatic analysis of the liberated formic acid. If the copolymers contain polymerized monomers of group c) in addition to the monomers a) and b), the polymerized monomers c) may also be chemically changed, depending on the chosen hydrolysis conditions; for example, vinyl alcohol units are formed from vinyl acetate units, acrylic acid units from methyl acrylate units, and acrylamide or acrylic acid units from acrylonitrile units. The degree of hydrolysis of the abovementioned units II is preferably from 60 to 95%.

Particularly suitable hydrolysis agents are mineral acids, such as hydrogen halide, which can be used in gaseous form or in aqueous solution. Hydrochloric acid, sulfuric acid, nitric acid and phosphoric acid and organic acids, such as $C_1$-$C_5$-carboxylic acids and aliphatic or aromatic sulfonic acids, are preferably used. The pH in the acidic hydrolysis is from −1 to 5, preferably from 0 to 2. From 0.05 to 2, preferably from 1 to 1.5, mole equivalents of an acid are required per equivalent of formyl groups which is to be eliminated from the polymerized units II.

The hydrolysis of the polymerized units of the structure II can also be carried out with the aid of bases, for example metal hydroxides, in particular alkali metal or alkaline earth metal hydroxides. Sodium hydroxide or potassium hydroxide is preferably used. The hydrolysis can, if required, also be carried out in the presence of ammonia or amines.

The hydrolysis of the copolymers in aqueous solution or suspension at reaction temperatures of from 20° to 100° C. has proven particularly suitable. If the unhydrolyzed copolymers are poorly soluble in water, they generally dissolve in the reaction medium as the hydrolysis progresses. After an acidic hydrolysis, the reaction mixture is, if required, neutralized with bases, preferably sodium hydroxide solution. If the hydrolysis has been carried out using a base, the reaction mixture can, if required, be neutralized by adding an acid, preferably hydrochloric acid. After the hydrolysis, the pH of the reaction mixture may be from 1 to 10, preferably from 3 to 8. Depending on the composition, the hydrolyzed copolymers may be poorly soluble in certain pH ranges. The K value of the hydrolyzed copolymers is from 10 to 300, preferably from 15 to 200 (measured in 5% strength aqueous sodium chloride solution at a polymer concentration of 0.1% by weight, a pH of 1.5 and 25° C.).

According to the invention, the hydrolyzed copolymers are used in papermaking. They are added to the paper stock in amounts of from 0.01 to 5, preferably from 0.1 to 2, % by weight, based on dry fibers. The hydrolyzed copolymers both increase the drainage rate and the retention in papermaking and at the same time increase the dry and wet strength of the paper.

The K values of the copolymers were determined according to H. Fikentscher, Cellulosechemie, 13 (1932), 48–64 and 71–74, in 5% strength aqueous sodium chloride solution at 25° C. and at a polymer concentration of 0.1% by weight, the K value of the unhydrolyzed copolymers being measured at pH 7 and that of the hydrolyzed copolymers at 1.5.

EXAMPLES

Preparation of the copolymers

Copolymer 1

991 g of distilled water, 1.54 g of 75% strength phosphoric acid and 1.06 g of 50% strength aqueous sodium hydroxide solution are heated to 70° C. in a gentle stream of nitrogen in a polymerization apparatus equipped with a stirrer. As soon as this temperature has been reached, in the course of 2 hours a solution of 50 g of water, 39.2 g of acrylic acid and 43.6 g of 50% strength aqueous sodium hydroxide solution, separately from this 160 g of N-vinylformamide and likewise separately from this a solution of 25 g of water and 0.05 g of 2,2'-azobis(2-methylpropionamidine) dihydrochloride, are added uniformly. After the end of the monomer addition, a solution of 0.15 g of 2,2'-azobis(2-methylpropionamidine) dihydrochloride in 73 g of water is metered in over 1 hour, and the reaction mixture is then stirred for a further 2 hours at 70° C. and is then diluted with 800 g of water. The highly viscous solution thus obtainable has a solids content of 10.9% and a pH of 6.2. The K value of the copolymer is 177.

Hydrolysis of the polymerized N-vinylformamide of copolymer 1

500 g of the aqueous solution, described above, of a copolymer of 75.4% by weight of vinylformamide and 24.6% by weight of sodium acrylate, having a K value of 177, are initially taken in an apparatus equipped with a stirrer and are diluted with 250 g of water. The mixture is first stirred at room temperature, and 80.2 g of 38% strength hydrochloric acid are added in the course of 20 minutes. Thereafter, the reaction mixture is heated at 70° C. for 7 hours and is cooled to room temperature, and 120 g of a 10% strength aqueous sodium hydroxide solution are added. The pH of the reaction mixture is then 1.5. In order to stabilize the reaction mixture, 15 g of 0.5% strength aqueous sodium bisulfite solution are added. The degree of hydrolysis of the polymerized N-vinylformamide is 93%. The solution has a polymer content of 5.8% by weight (hydrolyzed copolymer 1). The K value of the polymer is 135.

Copolymer 2

965.3 g of wager, 1.34 g of a 75% strength aqueous phosphoric acid and 0.92 g of a 50% strength aqueous sodium hydroxide solution are heated to 70° C. in a stream of nitrogen in a polymerization apparatus. As soon as this temperature has been reached, a mixture of 100 g of water, 60 g of acrylic acid and 66.5 g of 50% strength aqueous sodium hydroxide solution, separately from this 141.4 g of N-vinylformamide and likewise separately from this a solution of 0.05 g of 2,2'-azobis(2-methylpropionamidine) dihydrochloride in 25 g of water are added uniformly, in each case in the course of 2 hours. After the end of the addition of initiator and monomers, a solution of 0.15 g of 2,2'-azobis(2-methylpropionamidine) dihydrochloride, dissolved in 73 g of water, is added in the course of 1 hour, the reaction mixture is kept at 70° C. during this time and for 2 hours after the addition of the initiator. 800 ml of water are then added, and a highly viscous solution which has a solids content of 11.0% and a pH of 6.6 is obtained. The K value of the copolymer is 172.

Hydrolysis 500 g of the aqueous solution, described above, of the copolymer of 64.1% by weight of N-vinylformamide and 35.9% by weight of sodium acrylate are initially taken in a stirred apparatus and are diluted by adding 250 g of water. 77.2 g of 38% strength hydrochloric acid are then added in the course of 20 minutes at room temperature. The reaction mixture is then heated to 70° C. and stirred for 8 hours at this temperature. Thereafter, it is cooled to room temperature and 120 g of 10% strength aqueous sodium hydroxide solution are added. The pH of the mixture is then 1.5. In order to stabilize the reaction mixture, 15 g of 0.5% strength aqueous sodium bisulfite solution are added. The degree of hydrolysis of the polymerized N-vinylformamide is 95%. The reaction solution has a polymer content of 5.6%. The copolymer contains vinylamine hydrochloride units, vinylformamide units and acrylic acid units (hydrolyzed copolymer 2). The K value of the polymer is 126.

EXAMPLE 1

A 0.5% strength stock suspension in water was prepared from 50% of spruce sulfite pulp and 50% of beech sulfite pulp. The pH of the stock suspension was 7.0 and the Schopper-Riegler (SR) freeness was 30°. The stock suspension was then divided into 5 equal parts, 4 of which were mixed with the additives stated under b) to e). The 5 stock suspensions were then processed to give sheets having a basis weight of 80 g/m² in a Rapid-Köthen laboratory sheet former.

Composition of the stock suspensions:
a) The stock suspension contained no further additives.
b) 1%, based on the fibers, of an aqueous solution of a commercial neutral wet strength resin based on a reaction product of epichlorohydrin and a polyamidoamine obtained from diethylenetriamine and adipic acid was added to the stock suspension.
c) 1%, based on fiber, of an aqueous solution of a polyvinylamine hydrochloride according to U.S. Pat. No. 2,721,140 was added to the stock suspension.
d) 1%, based on fiber, of the hydrolyzed copolymer 1 was added to the stock suspension.
e) 1%, based on fiber, of the hydrolyzed copolymer 2 was added to the stock suspension.

The sheets a) to e) were produced from the paper stock suspensions described above. The whiteness, the dry breaking length and the wet breaking length of the sheets obtained were measured. The results are shown in Table 1.

TABLE 1

|  | Comparison | | | (According to the invention) | |
| --- | --- | --- | --- | --- | --- |
|  | a) | b) | c) | d) | e) |
| Whiteness (% reflectance) | 77.9 | 73.5 | 73.4 | 73.1 | 74.0 |
| Dry breaking length (m) | 2354 | 2903 | 2927 | 3102 | 2895 |
| Wet breaking length (m) |  |  |  |  |  |
| Unaged | 104 | 908 | 978 | 1009 | 956 |
| Edged 5 min at 110° C. | 106 | 1032 | 1005 | 1118 | 1040 |

EXAMPLE 2

A 0.5% strength stock suspension in water was prepared from 50% of spruce sulfite pulp and 50% of beech sulfite pulp. The pH of the stock suspension was 4.5 and the freeness was 30°SR. The stock suspension was then divided into 5 equal parts, of which the samples b) to e) were each mixed with 1%, based on dry fiber, of the additives stated below. The following stock suspensions were processed:
a) The stock suspension described above contained no further additives.
b) An aqueous solution of a commercial wet strength resin based on a reaction product of urea and formaldehyde was added to the stock suspension.
c) An aqueous solution of a hydrolyzed copolymer of 70% of N-vinylformamide and 30% of vinyl acetate was added to the stock suspension, the K value of the polymer being 100 and the degree of hydrolysis of N-vinylformamide and vinyl acetate being >90%.
d) The hydrolyzed copolymer 1 was added to the stock suspension.
e) The hydrolyzed copolymer 2 was added to the stock suspension.

The stock suspensions described above were processed on a Rapid-Köthen apparatus to give the sheets a) to e). The whiteness, dry breaking length and wet strength of the sheets obtained are shown in Table 2.

TABLE 2

|  | Comparison | | | (According to the invention) | |
| --- | --- | --- | --- | --- | --- |
|  | a) | b) | c) | d) | e) |
| Whiteness (% reflectance) | 80.4 | 77.9 | 75.1 | 75.3 | 75.8 |
| Dry breaking length (m) | 3278 | 3817 | 3950 | 4551 | 4159 |
| Wet breaking length (m) |  |  |  |  |  |
| Unaged | 134 | 796 | 1024 | 1101 | 877 |
| Aged 5 min at 130° C. | 143 | 1031 | 1062 | 1196 | 998 |

EXAMPLE 3

A 0.2% strength stock suspension in water was prepared from mixed waste paper. The pH of the suspension was 7 and the freeness was 67°SR. The stock suspension was divided into 10 equal parts. One sample of the stock suspension remained unchanged, while the additives stated below were added to the other 9 samples. The following samples were available:
a) The stock suspension described above contains no further additives.
b) 0.1%, based on the solids, of a 0.1% strength aqueous solution of a commercial neutral wet strength resin based on a reaction product of epichlorohydrin and a polyamidoamine obtained from diethylenetriamine and adipic acid was added to the stock suspension described above.
c) 0.2%, based on the solids, of the commercial neutral wet strength resin described under b) was added to the stock suspension described above.
d) 0.4%, based on the solids, of the commercial neutral wet strength resin described under b) was added to the stock suspension described above.
e) 0.1%, based on the solids, of a 0.1% strength aqueous solution of the hydrolyzed copolymer 2 was added to the stock suspension described above.
f) 0.2%, based on the solids, of a 0.1% strength aqueous solution of the hydrolyzed copolymer 2 was added to the stock suspension described above.
g) 0.4%, based on the solids, of a 0.1% strength aqueous solution of the hydrolyzed copolymer 2 was added to the stock suspension described above.
h) 0.1%, based on the solids, of a 0.1% strength aqueous solution of the hydrolyzed copolymer 1 was added to the stock suspension described above.
i) 0.2%, based on the solids, of a 0.1% strength aqueous solution of the hydrolyzed copolymer 1 was added to the stock suspension described above.
j) 0.4%, based on the solids, of a 0.1% strength aqueous solution of the hydrolyzed copolymer 1 was added to the stock suspension.

After the additive had been allowed to act for 5 minutes, the samples b) to j) were each drained in a laboratory sheet former with formation of sheets having a basis weight of 68 g/m². In order to determine the ash content and hence obtain a measure of the retention, the sheets were incinerated in a muffle furnace at from 900° to 1000° C. and the residue on ignition was determined gravimetrically. The results obtained are shown in Table 3.

TABLE 3

| Example | % Ash in paper | Addition in % |
|---|---|---|
| a) Comparative Example | 5.1 | 0 |
| b) Comparative Example | 8.6 | 0.1 |
| c) Comparative Example | 9.0 | 0.2 |
| d) Comparative Example | 10.1 | 0.4 |
| e) (According to the invention) | 10.2 | 0.1 |
| f) (According to the invention) | 11.2 | 0.2 |
| g) (According to the invention) | 11.6 | 0.4 |
| h) (According to the invention) | 10.4 | 0.1 |
| i) (According to the invention) | 11.1 | 0.2 |
| j) (According to the invention) | 11.4 | 0.4 |

EXAMPLE 4

A 0.2% strength stock suspension in water was prepared from mixed waste paper. The pH of the stock suspension was 7 and the freeness was 67°SR. The stock suspension was divided into 10 equal parts, 9 of which were mixed with the additives stated below:
a) This sample contained no additives.
b) 0.1%, based on the solids, of a 0.1% strength aqueous solution of a commercial neutral wet strength resin based on a reaction product of epichlorohydrin and a polyamidoamine obtained from diethylenetriamine and adipic acid was added to the stock suspension.
c) 0.25% of the commercial neutral wet strength resin described under b) was added to the suspension described above.
d) 0.4%, based on the solids, of the neutral wet strength resin described under b) was added to the stock suspension described above.
e) 0.1%, based on the solids, of a 0.1% strength aqueous solution of the hydrolyzed copolymer 2 was added to the stock suspension.
f) 0.25% of the hydrolyzed copolymer 2 was added to the suspension.
g) 0.4%, based on the solids, of the hydrolyzed copolymer 2 was added to the suspension.
h) 0.1%, based on the solids, of a 0.1% strength aqueous solution of the hydrolyzed copolymer 1 was added to the stock suspension described above.
i) 0.25%, based on the solids, of the hydrolyzed copolymer 1 was added to the stock suspension.
j) 0.4%, based on the solids, of the hydrolyzed copolymer 1 was added to the suspension.

After an action time of 5 minutes, the samples described above were drained on a Schopper-Riegler apparatus at room temperature. The drainage time is shown in Table 4.

TABLE 4

| Example | Drainage time (s/700 ml) | Addition in % |
|---|---|---|
| a) Comparative Example | 89 | 0 |
| b) comparative Example | 68 | 0.1 |
| c) Comparative Example | 60 | 0.25 |
| d) Comparative Example | 50 | 0.4 |
| e) (According to the invention) | 57 | 0.1 |
| f) (According to the invention) | 21 | 0.25 |
| g) (According to the invention) | 10 | 0.4 |
| h) (According to the invention) | 46 | 0.1 |
| i) (According to the invention) | 31 | 0.25 |
| j) (According to the invention) | 21 | 0.4 |

We claim:
1. A process for the production of paper with high dry and wet strengths, wherein the drainage rate and the retention are increased, comprising adding in an amount of 0.01 to 5 wt %, based on dry fibers, to paper stock containing no further additives, a copolymer having a K value of 30–300 obtained by copolymerization of a) 5 to 99 mol % of an N-vinylcarboxamide of the formula

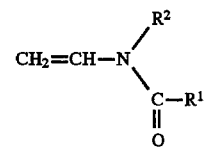

wherein $R^1$ and $R^2$ are H,
b) 95 to 1 mol % of monoethylenically unsaturated carboxylic acids having 3 to 8 carbon atoms or the alkali metal, alkaline earth metal or ammonium salts thereof,
c) 0 to 30 mol % of vinyl acetate, N-vinylpyrrolidone, N-vinylimidazole or a mixture thereof, and
d) 0 to 2 mol % of copolymerizable compounds having at least two ethylenically unsaturated nonconjugated double bonds, and subsequent partial or complete elimination of said groups

from said N-vinylcarboxyamide polymerized in the copolymer, with formation of amino or ammonium groups.

2. The process of claim 1, wherein said copolymer is obtained by copolymerization of
   a) 30 to 95 mol % N-vinylformamide,
   b) 70 to 5 mol % of acrylic acid, methylacrylic acid or alkali metal, alkaline earth metal or ammonium salts thereof, and
   c) 0 to 30 mol % of vinyl acetate, N-vinylpyrrolidone, N-vinylimidazole or mixtures thereof, and subsequent elimination of 10 to 100% of formyl groups on said vinylformamide monomers polymerized in the copolymer.

3. The process of claim 1, wherein 0.1 to 2 wt % of said copolymer is added to said paper stock.

4. The process of claim 1, wherein said copolymer comprises 30–95 mol % of said N-vinylcarboxamide and 70–5 mol % of said monoethylenically unsaturated carboxylic acids.

5. The process of claim 1, wherein said copolymer is prepared by copolymerizing 1–20 mol % of vinyl acetate, N-vinylpyrrolidone, N-vinylimidazole or mixtures thereof.

6. The process of claim 1, wherein said copolymer is prepared by copolymerizing 0.01 to 1 mol % of said copolymerizable compound having at least two ethylenically unsaturated nonconjugated double bonds.

7. The process of claim 1, wherein said partial or complete elimination of said acyl groups comprises elimination of 30 to 100% of said groups.

8. The process of claim 7, wherein said partial or complete elimination of said acyl groups is partial elimination of 60 to 95% of said groups.

* * * * *